US006736669B1

(12) United States Patent
Martin et al.

(10) Patent No.: US 6,736,669 B1
(45) Date of Patent: May 18, 2004

(54) CABLE ORGANIZING AND SECURING DEVICE

(76) Inventors: Dennis J. Martin, 720 Rose Ave., Garner, IA (US) 50438; Brent D. McNeese, 720 Rose Ave., Garner, IA (US) 50438

( * ) Notice: Subject to any disclaimer, the term of this patent is extended or adjusted under 35 U.S.C. 154(b) by 0 days.

(21) Appl. No.: 10/342,468

(22) Filed: Jan. 14, 2003

(51) Int. Cl.$^7$ ............................................... H01R 13/60
(52) U.S. Cl. ...................................... 439/527; 439/610
(58) Field of Search .......................... 29/592.1; 174/135, 174/168; 439/98, 527, 607, 610

(56) References Cited

U.S. PATENT DOCUMENTS

| | | | | | |
|---|---|---|---|---|---|
| 2,650,948 | A | * | 9/1953 | Findlay | 174/168 |
| 2,746,112 | A | * | 5/1956 | Simon | 24/129 B |
| 3,491,971 | A | * | 1/1970 | Fisher | 248/65 |
| 4,916,804 | A | * | 4/1990 | Yoshimura et al. | 29/592.1 |
| 5,222,909 | A | * | 6/1993 | Nomura et al. | 439/607 |
| 5,304,067 | A | * | 4/1994 | Inaba et al. | 439/98 |
| D369,954 | S | * | 5/1996 | Otramba | D8/356 |
| 5,833,495 | A | * | 11/1998 | Ito | 439/610 |
| 5,990,420 | A | * | 11/1999 | Alexander | 174/135 |
| 6,227,502 | B1 | * | 5/2001 | Derman | 248/74.4 |
| 6,299,486 | B1 | * | 10/2001 | Morikawa et al. | 439/610 |
| 6,386,919 | B2 | * | 5/2002 | Medina et al. | 439/610 |

* cited by examiner

Primary Examiner—Gary Paumen
Assistant Examiner—James R. Harvey

(57) ABSTRACT

A molded block assembly for organizing and securing cables and/or wires to a mounting surface. The assembly is generally rectangular shaped and has two separate sections, a back mounting block and a front-cap, which are locked together by means of a threaded cap screw. The back mounting block has one or more wire slots, generally aligned along each side, for holding wires and cables in place. The front-cap has one or more extended ribs, with indentures that align with the wire slots in the back mounting block, for clamping the wires in place when the front-cap is attached. All four sides of the assembly slope inward from back to front, giving an aesthetically pleasing appearance. One or more adhesive strips, attached to the back outside surface of the back mounting block, permit fast and easy installation of the device on to a wall, desk, or other mounting surface without damaging the surface.

19 Claims, 4 Drawing Sheets

CABLE ORGANIZING AND SECURING DEVICE

BACKGROUND OF THE INVENTION

1. Field of the Invention

The present invention relates to cable and wire organizers for use in connection with routing electrical cables. The cable organizing and securing device has particular utility in connection with both securing cable runs and providing an aesthetically pleasing appearance of a bundle of cables.

2. Description of the Prior Art

Cable and wire organizers are desirable for anyone having modern electronic equipment in the home or office. Installation of apparatus like telephones, computers, satellite, cable TV, surround sound systems, etc. can quickly turn in to a "rats" nest of cables and wires that can become tangled and difficult to handle. This can become an "eye sore", which has to be hidden beneath or behind a piece of furniture on other item.

The use of wire holders and cable grippers are known in the prior art. For example, U.S. Pat. No. 6,227,502 to Derman discloses an electrical cord and cable gripper. However, the Derman '502 patent uses a T-shaped locking mechanism and does not provide a quick and easy method for mounting the gripper on a wall or other surface without damaging the surface.

U.S. Pat. No. 2,650,948 to Findlay discloses a wire holder primarily for use in airplanes. However, the Findlay '948 patent does not provide a simple and cheap screw-on cover to clamp the wires, but rather uses a pivotal pressure bar for clamping the wires, and additionally uses screws to mount the device to a surface and would therefore likely damage the surface due to the drilled holes.

Also, U.S. Des. Pat. No. D369,954 to Otramba discloses an electric fence wire retainer design, but the utility of this patent does not provide a method for organizing a bundle of wires but rather to attach and insulate the electric fence wire.

U.S. Pat. No. 5,990,420 to Alexander discloses a hinged comb structure for securing multiple cables using a Velcro latch. However, the Alexander '420 patent does not appear to tightly clamp the cables, and has the additional deficiency of not providing an attaching means for mounting the device to a wall or surface in a non-marring manner.

Finally, U.S. Pat. Nos. 2,746,112 to Simon and 3,491,971 to Fisher disclose small baseboard clips for securing individual cords, but do not provide any means for organizing and firmly clamping larger numbers of cables.

While the above-described devices fulfill their respective, particular objectives and requirements, the aforementioned patents do not describe a cable organizer and securing device that allows a large number of cables and/or wires to be neatly positioned and secured. Furthermore, the above patents do not address the provision for securing the devices to a wall or other surface without damaging the surface.

Therefore, a need exists for a new and improved cable organizing and securing device that can be used for multiple cables and wires without damaging the mounting surface in this regard, the present invention substantially fulfills this need. In this respect, the cable organizing and securing device according to the present invention substantially departs from the conventional concepts and designs of the prior art, and in doing so provides an inexpensive and easy to use apparatus primarily developed for the purpose of organizing cables, wires, and cords without any damaging to the mounting surface.

SUMMARY OF THE INVENTION

In view of the foregoing disadvantages inherent in the known types of cable clamping devices now present in the prior art the present invention provides an improved cable organizing and securing device, and overcomes the above-mentioned disadvantages and drawbacks of the prior art. As such, the general purpose of the present invention, which will be described subsequently in greater detail, is to provide a new-and improved cable organizing and securing device, which has all the advantages of the prior art mentioned heretofore and many novel features that result in a cable organizing and securing device that is not anticipated, rendered obvious, suggested, or even implied by the prior art, either alone or in any combination thereof To attain this, the present invention essentially comprises a molded block assembly for organizing and securing cables and/or wires to a mounting surface. The assembly is generally rectangular shaped and has two separate sections, these being a back mounting block and a front-cap which are locked together by means of a threaded cap screw. The back mounting block has one or more wire slots, generally aligned along each side, for holding wires and cables in place. The front-cap has one or more ribs, with indentures that align with the wire slots in the back mounting block, that extend into the back mounting block for clamping the wires in place when the front-cap is attached. All four sides of the assembly slope inward from back to front, giving an aesthetically pleasing appearance. One or more adhesive strips, attached to the back outside surface of the back mounting block, permit fast and easy installation of the device on to a wall, desk, or other mounting surface without damaging the surface.

The device can be mounted on a surface to allow the cables or wires to run in any desired orientation, e.g., horizontal, vertical, or diagonal. In addition, the wire slots can be made to handle various sizes and numbers of wires or cables.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new cable organizing and securing device, which both organizes and secures multiple cables and wires, thereby preventing a tangled mess of cables and wires within an office or home environment.

It is a further object of the present invention to provide a new cable organizing and securing device that provides in the apparatuses and methods of the prior art some, of the advantages thereof, while simultaneously overcoming some of the disadvantages normally associated therewith.

An even further object of the present invention to provide a new and improved cable organizing and securing device that is relatively small, compact, and easy to use by do-it-yourselfers.

Even still another object of the present invention is to provide a new and improved cable organizing and securing device that may be easily and efficiently manufactured and marketed.

Still yet another object of the present invention is to provide a new and improved cable organizing and securing device that has a low cost of manufacture with regard to both materials and labor, and which accordingly is then susceptible of low prices of sale to the consuming public, thereby making such cable organizing and securing device economically available to the buying public.

Lastly, it is an object of the present invention to provide a new and improved method for organizing and securing multiple cables and wires.

These together with other objects of the invention, along with the various features of novelty that characterize the invention are pointed out with particularity in the claim is annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
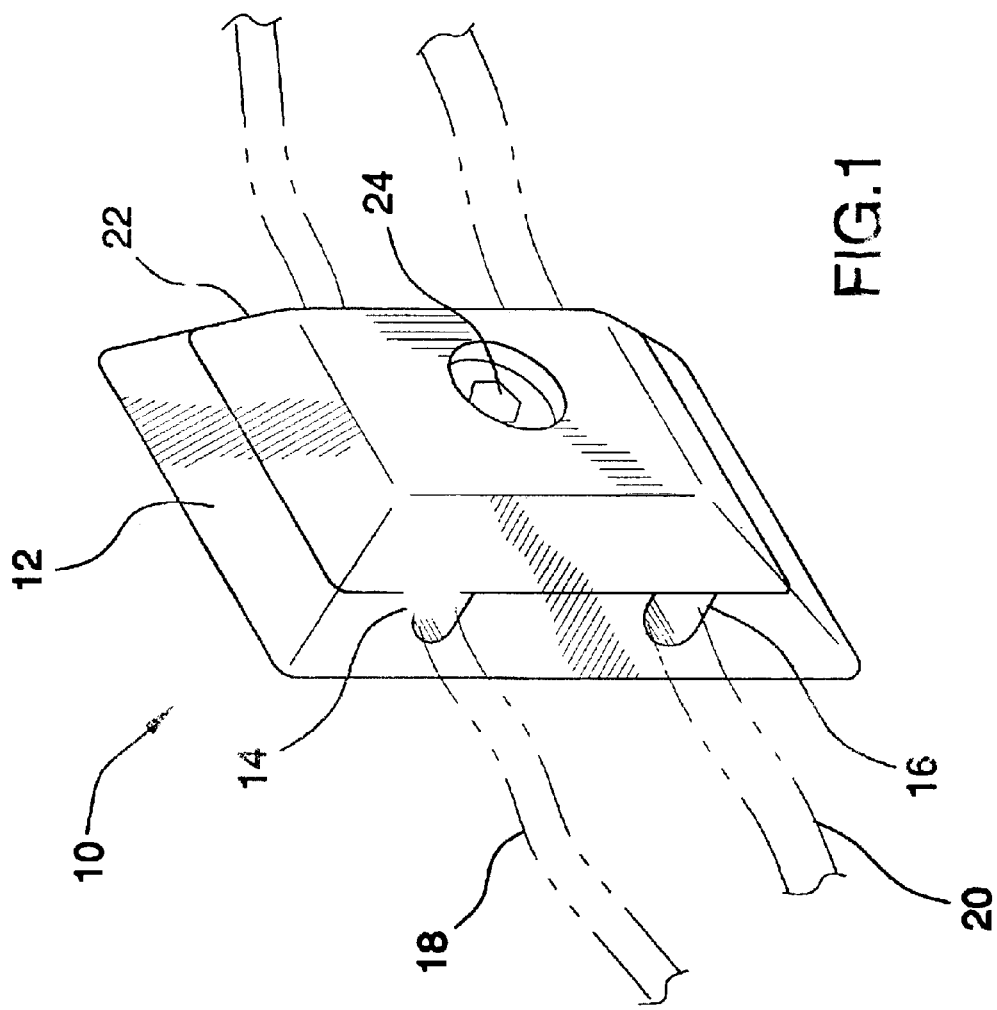
FIG. 1 is a perspective view of the preferred embodiment of the cable organizing and securing device constructed in accordance with the principles of the present invention.

Referring now to FIGS. 1–4 of the drawings, a preferred embodiment of the cable organizing and securing device of the present invention is shown and generally designated by the reference numeral 10.

Figure 2:
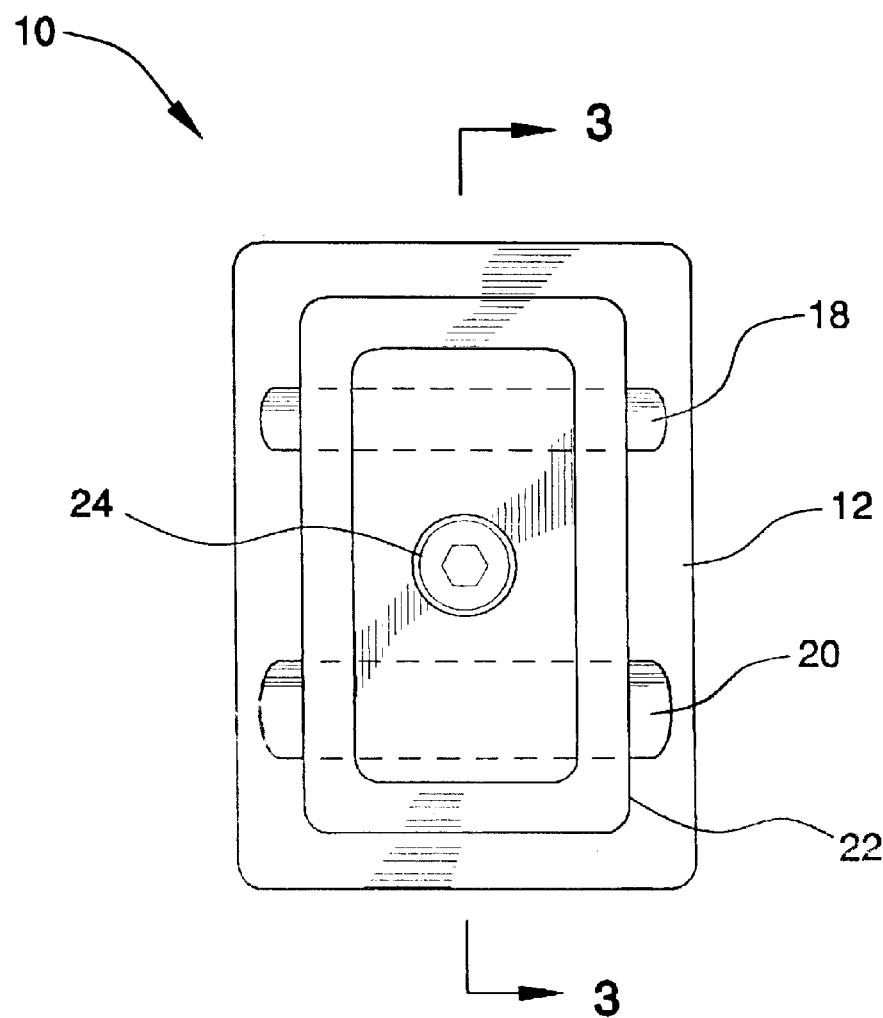
FIG. 2 is a drawing showing the front view of the cable organizing and securing device of the present invention.

FIGS. 1 and 2 show perspective and front views, respectively, of the new and improved cable organizing and securing device 10 of the present invention for organizing and securing multiple cables and wires. The assembly is generally rectangular shaped and has two separate sections, a back mounting block 12 and a front-cap 22, which are locked together by means of a threaded cap screw 24. The back mounting block 12 has a solid back plate and four sides and is open on the front for accepting wires. The two longer parallel sides each have one or more wire slots 14,18, aligned side-to-side, for holding the wires and cables in place. These slots can be made varies sizes to accommodates different wire gauges; e.g., slot 14 for smaller wires 18 and slot 16 for larger wires 20. The front-cap has one or more extended ribs (not shown in these views), with indentures that extend into the back mounting block 12 and align with the wire slots for clamping the wires in place when the front-cap 22 is attached. All four sides of the assembly slope inward from back to front, giving an aesthetically pleasing appearance. One or more adhesive strips (not shown in these views), attached to the back outside surface of the back mounting block 12, permit fast and easy installation of the device on to a wall, desk, or other mounting surface without damaging the surface. Optionally, the device can be made square in shape.

Figure 3:
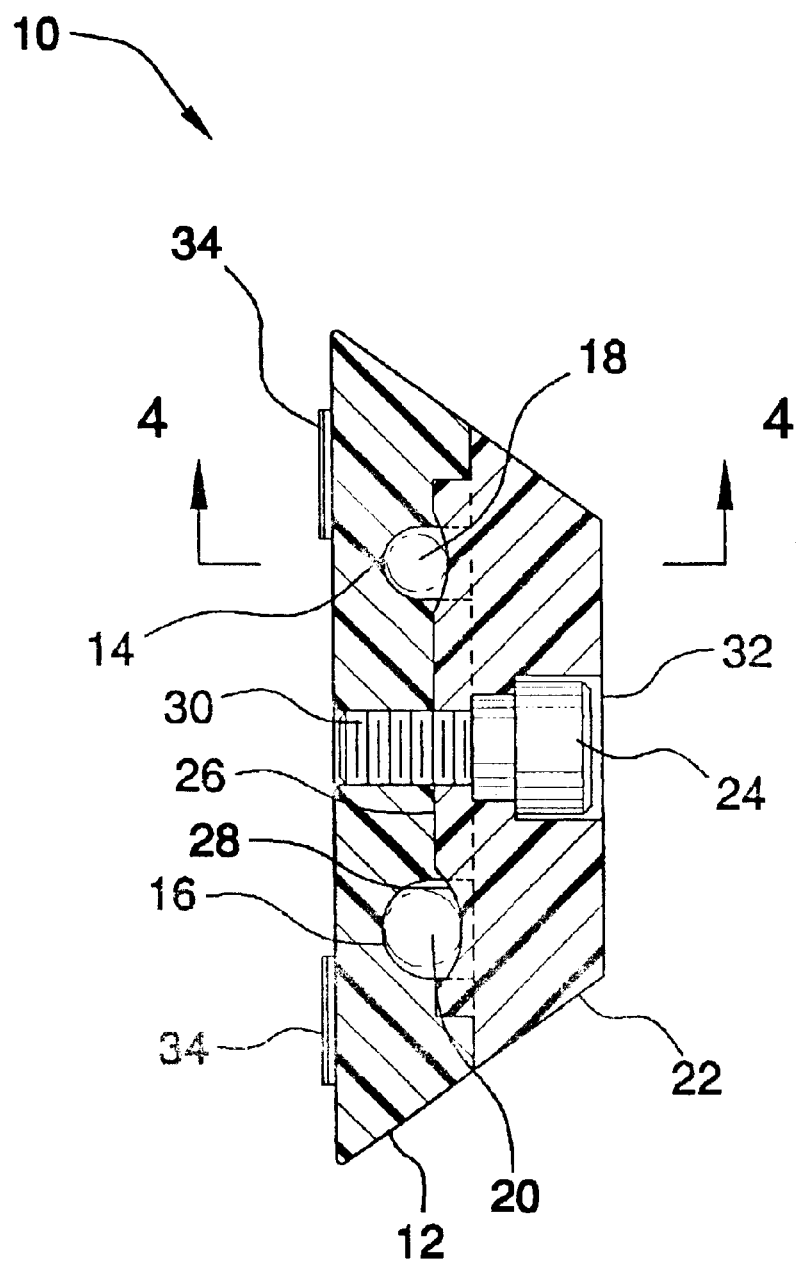
FIG. 3 is a cross-sectional drawing showing a side view of the cable organizing and securing device of the present invention.

FIG. 3 is a cross-sectional drawing showing a side view of the cable organizing and securing device 10 of the present invention. This view shows the back mounting block 12 with attached adhesive strips 34 for mounting the device on to a surface, with wires 18,20 installed in slots 14,16, respectively, and the front-cap 22 attached. The front cap 22 has a solid front surface with a center located body hole 32 and four sloping sides, which align with the sloping sides of the back mounting block 12, as well as one or more molded ribs 26 with concave indentures 28, which extend into the back mounting block 12 and are aligned with the wire slots, for applying pressure and clamping the wires. A threaded hole 30 is located in the center of the back mounting block 12 for receiving the cap screw 24, which hold the front-cap 22 in place and applies pressure to the cables or wires.

Although, the preferred embodiment discloses the case where wire are routed in one direction only, one or more additional slots could also be located along the short sides of the device to secure perpendicular routed wires. In this second embodiment, the slots going in one direction would be made deeper that those in the opposite direction in order for the perpendicular wires to cross.

Figure 4:
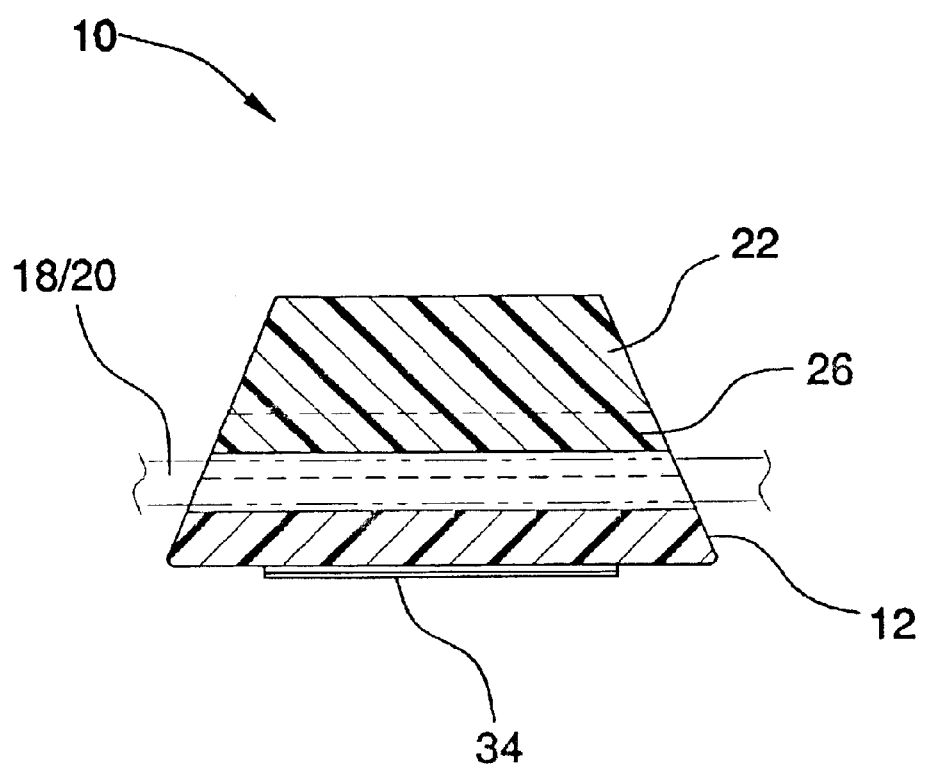
FIG. 4 is a cross-sectional drawing showing the top view of the cable organizing and securing device of the present invention.

Finally, FIG. 4 is a cross-sectional drawing showing the top view of the cable organizing and securing device 10 of the present invention. Again, this shows the back mounting block 12 with attached adhesive strips 34 and wires 18/20 placed in one of the slots. The front-cap 22 with clamping rib 16 is shown clamping the wires 18/20. The device might typically be as small as 1.5-inches long by 0.75-inch wide by 0.5-inch high, although it could be scaled to any size depending on a particular application.

Operationally, once the wires are neatly installed in the slots in an organized manner, the front-cap 22 is applied over the back mounting block 12 and secured by means of the cap screw 24, with the molded clamping ribs 26 applying pressure to the wires 18/20, thereby holding them tightly in place.

While a preferred embodiment of the cable organizing and securing device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, hard rubber, phenolic resin, or fiberglass may be used to fabricate the device. And although a cable organizing and securing device has been described, it should be appreciated that the device herein described is also suitable for organizing and securing other materials requiring run-lengths, such as plumbing tubing and pipe, electrical conduit, etc.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A cable securing device for attaching multiple cables, comprising:
    a rectangular shaped back mounting block, said block having a solid back surface, said back surface containing a center positioned threaded cap screw hole, said block having four sides and an open front, said sides sloping inwardly from said back surface to said open front, two parallel shorter sides being solid, two parallel longer sides having multiple wire slots for holding wires, said slots being aligned from side to side;
    a rectangular shaped front-cap, said cap having a generally open back opening and a solid front surface with a cap screw body hole located at the center of said front surface, said front-cap further having sides sloping inwardly from said open back to said front surface, said sides being sized to align with said sloping sides of said back mounting block, continuing said sloping sides of said mounting block two or more molded ribs positioned parallel to the longer sides of said rectangular front-cap, said ribs being evenly spaced across the narrow length of said front-cap, said ribs extended outward from said open back of said front-cap, said ribs further having multiple molded concave indentures aligning with said wire slots in said back mounting block for applying pressure to said wires;
    a cap screw having a turning slot means at the cap end and being threaded at the opposite end, said cap screw installed in said body hole of said front-cap and secured to said threaded hole in said back mounting block for mounting said front-cap to said back mounting block, applying pressure to said wires loaded into said slots of said back mounting block, thereby securing said wires; and
    one or more adhesive strips applied to the outer back surface of said back mounting block for attaching said cable securing device to a mounting surface.

2. The cable securing device of claim 1 wherein said wire slots are of varying size to accommodate various wire gauges.

3. The cable securing device of claim 2 wherein said device is mounted to secure wires running in a horizontal direction.

4. The cable securing device of claim 2 wherein said device is mounting to secure wires running in a vertical direction.

5. The cable securing device of claim 1 wherein the shape of said device is square.

6. The cable securing device of claim 5 further comprising additional wire slots along the said parallel shorter sides of said back mounting blocks, the depth of said slots being adjusted to accommodate additional wires running perpendicular to and crossing said wires in said longer sides of said back mounting block.

7. The cable securing device of claim 1 wherein said device is fabricated from the group of materials comprised of: plastic, hard rubber, phenolic resin, and fiberglass.

8. The cable securing device of claim 1 wherein said device is mounted to said wall surface by means of multiple hook and loop fasteners.

9. The cable securing device of claim 1 wherein said device secures multiple cables of the type contained in the group comprises of: telephone cables, power cords, computer cables, printer cables, fax cables, copier cables, audio cables, lamp cords, electrical conduit, plumbing tubing, and plumbing pipe.

10. A cable organizing device for attaching multiple cables, comprising:
    a rectangular shaped back mounting block, said block having a solid back surface, said back surface containing a center positioned threaded cap screw hole, said block having four sides and an open front, said sides sloping inwardly from said back surface to said open front, two parallel shorter sides being solid, two parallel longer sides having multiple wire slots for holding wires, said slots being aligned from side to side, said cable being loaded into said slots in order of function;
    a rectangular shaped front-cap, said cap having a generally opening and a solid front surface with a cap screw body hole located at the center of said front surface, said front-cap further having sides sloping inwardly from said open back to said front surface, said sides being sized to align with said sloping sides of said back mounting block, continuing said sloping sides of said mounting block two or more molded ribs positioned parallel to the longer sides of said rectangular front-cap, said ribs being evenly spaced across the narrow length of said front-cap, said ribs extended outward from said open back of said front-cap, said ribs further having multiple molded concave indentures aligning with said wire slots in said back mounting block for applying pressure to said wires;
    a cap screw having a turning slot means at the cap end and being threaded at the opposite end, said cap screw installed in said body hole of said front-cap and secured to said threaded hole in said back mounting block for mounting said front-cap to said back mounting block, applying pressure to said wires loaded into said slots of said back mounting block, thereby securing said wires; and
    one or more adhesive strips applied to the outer back surface of said back mounting block for attaching said cable organizing device to a mounting surface.

11. The cable organizing device of claim 10 wherein said wire slots are of varying size to accommodate various wire gauges.

12. The cable organizing device of claim 11 wherein said device is mounted to secure wires running in a horizontal direction.

13. The cable organizing device of claim 11 wherein said device is mounting to secure wires running in a vertical direction.

14. The cable organizing device of claim 10 wherein the shape of said device is square.

15. The cable organizing device of claim 14 further comprising additional wire slots along the said parallel shorter sides of sad back mounting blocks, the depth of said slots being adjusted to accommodate additional wires running perpendicular to said wires in said longer sides of and crossing said back mounting block.

16. The cable organizing device of claim 10 wherein said device is fabricated from the group of materials comprised of: plastic, hard rubber, phenolic resin, and fiberglass.

17. The cable organizing device of claim 10 wherein said device is mounted to said wall surface by means of multiple hook and loop fasteners.

18. The cable organizing device of claim 10 wherein said device secures multiple cables of the type contained in the group comprises of: telephone cables, power cords, computer cables, printer cables, fax cables, copier cables, audio cables, lamp cords, electrical conduit, plumbing tubing, and plumbing pipe.

19. The cable organizing device of claim 10 wherein said device is scaled in size to handle large quantities of wires.

* * * * *